(12) United States Patent
McKittrick et al.

(10) Patent No.: US 12,511,445 B2
(45) Date of Patent: Dec. 30, 2025

(54) PASSWORD ENCRYPTION FOR SERVICING HIGH SECURITY SYSTEMS

(71) Applicant: DELL PRODUCTS L.P., Round Rock, TX (US)

(72) Inventors: Allen B. McKittrick, Cedar Park, TX (US); Daniel Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 338 days.

(21) Appl. No.: 18/363,927

(22) Filed: Aug. 2, 2023

(65) Prior Publication Data
US 2025/0045470 A1  Feb. 6, 2025

(51) Int. Cl.
*G06F 21/86* (2013.01)
*G06F 21/31* (2013.01)
*H05K 5/02* (2006.01)

(52) U.S. Cl.
CPC ............ *G06F 21/86* (2013.01); *G06F 21/31* (2013.01); *H05K 5/0208* (2013.01); *H05K 5/0221* (2013.01); *H05K 5/0247* (2013.01)

(58) Field of Classification Search
CPC ...................................................... G06F 21/86
See application file for complete search history.

(56) References Cited

U.S. PATENT DOCUMENTS

| | | | |
|---|---|---|---|
| 10,495,254 B2 | 12/2019 | Torres et al. | |
| 2010/0283270 A1* | 11/2010 | Hood, III | G06F 1/1679 292/251.5 |
| 2021/0011520 A1* | 1/2021 | Bhat | G06F 1/1679 |

* cited by examiner

*Primary Examiner* — Jerry Wu
(74) *Attorney, Agent, or Firm* — Larson Newman, LLP

(57) ABSTRACT

An information handling system includes top and bottom housings, multiple fixed locking magnets secured within the bottom housing, multiple movable locking magnets located within the top housing, and a contracting wire in physical communication with each of the movable locking magnets. The contracting wire shrinks in length based on a voltage being applied to the contracting wire. The contracting wire exerts a force on each of the movable locking magnets as the length of the contracting wire shrinks. Each of the movable locking magnets transition from a locked position to an unlocked position based on the force exerted by the contracting wire. The top and bottom housings separate when each of the movable locking magnets are in the unlocked position.

19 Claims, 6 Drawing Sheets

PASSWORD ENCRYPTION FOR SERVICING HIGH SECURITY SYSTEMS

FIELD OF THE DISCLOSURE

The present disclosure generally relates to information handling systems, and more particularly relates to password encryption for servicing high security systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes top and bottom housings, multiple fixed locking magnets secured within the bottom housing, multiple movable locking magnets located within the top housing, and a contracting wire in physical communication with each of the movable locking magnets. The contracting wire may shrink in length based on a voltage being applied to the contracting wire. The contracting wire may exert a force on each of the movable locking magnets as the length of the contracting wire shrinks. Each of the movable locking magnets may transition from a locked position to an unlocked position based on the force exerted by the contracting wire. The top and bottom housings may separate when each of the movable locking magnets are in the unlocked position.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
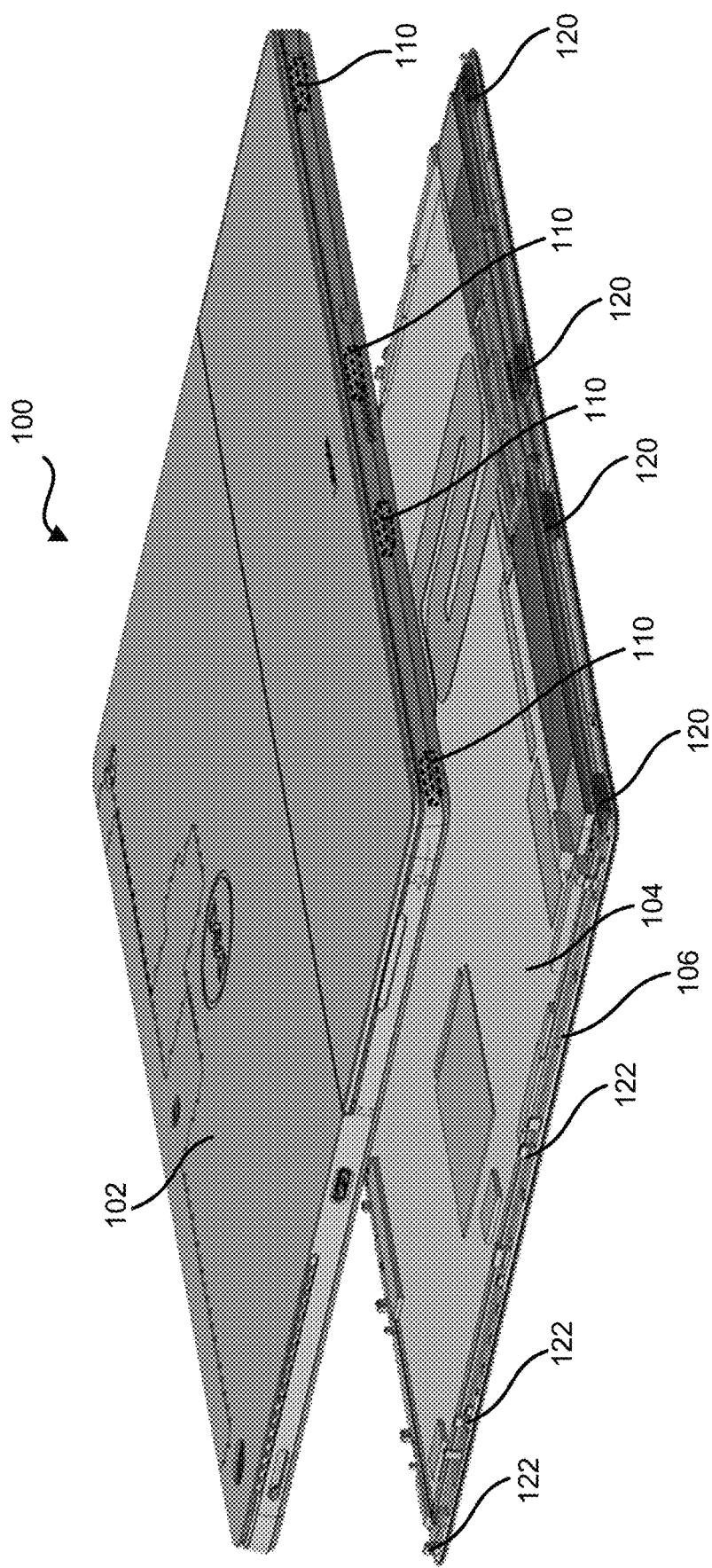
FIG. 1 is a perspective view of an information handling system according to at least one embodiment of the present disclosure.

FIG. 1 an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a back housing 102, a front housing 104, and bezel 106. In an example, bezel 106 may extend around an outer edge of front housing 104. Back housing 102 may include multiple components of information handling system 100, such as the components of information handling system 700 of FIG. 7. Information handling system 100 also includes fixed locking magnetics 110 within back housing 102. Information handling system 100 includes movable locking magnetics 120 and snap features 122 along bezel 106. Fixed locking magnetics 110 and movable locking magnetics 120 may be any suitable type of magnet, such as a neodymium magnet. In an example, snap features 122 may be replaced with additional fixed locking magnetics 110 and additional movable locking magnetics 120 without varying from the scope of this disclosure. Information handling system 100 may include additional components without varying from the scope of this disclosure.

In an example, back housing 102 may snap fit onto snap features 122 and fixed locking magnetics 110 may attract movable locking magnetics 120 to hold the back housing in physical communication with front housing 104. In certain examples, screws may be added along the edge of information handling system 100 where fixed locking magnetics 110 and moveable locking magnets 120 are located to further secure back housing 102 to front housing 104. While each fixed locking magnetic 110 is aligned with a corresponding one of movable locking magnetics 120, the attraction forces between the locking magnetics may prevent an individual from separating back housing 102 from front housing 104. As used herein, alignment between a fixed locking magnetic 110 and a corresponding movable magnetic 120 refers to opposite magnetic poles of the magnetics being aligned as will be described below with respect to FIGS. 5 and 6 below. In an example, if each fixed locking magnetic 110 is misaligned with a corresponding one of movable locking magnetics 120, the repulsion forces between the locking magnetics may form space between back housing 102 from front housing 104. This space may be substantially small but may enable an individual to separate back housing 102 from front housing 104. As used herein, misalignment between a fixed locking magnetic 110 and a corresponding movable magnetic 120 refers to similar magnetic poles of the magnetics being aligned as will be described below with respect to FIGS. 5 and 6 below.

Figure 2:
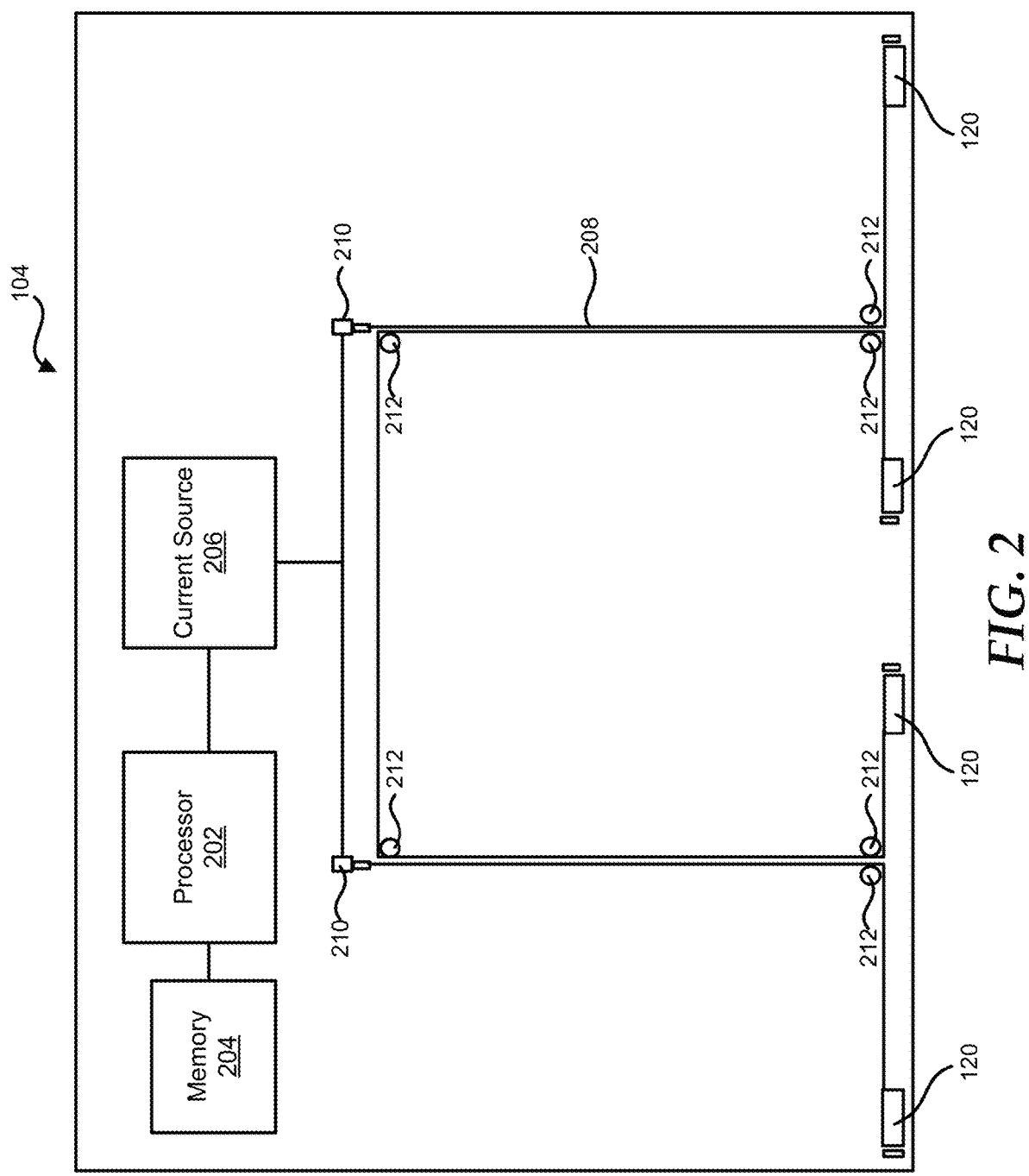
FIG. 2 is a block diagram of a locking system for an information handling system according to at least one embodiment of the present disclosure.

FIG. 2 illustrates a portion of information handling system 100 according to at least one embodiment of the present disclosure. Information handling system 100 includes a processor 202, a memory 204, a current source 206, a contracting wire 208, multiple wire components 210, multiple supports 212, and multiple movable locking magnetics 120. In an example, processor 202 may be any suitable processor, such as an embedded controller. Based on processor 202 being an embedded controller, the processor may execute one or more suitable operations and receive commands while information handling system 100 is shutdown or in a low power mode. In certain examples, current source 206 may be a stand-alone component or may be incorporated into another component, such as a motherboard, of information handling system 100. Contracting wire 208 may be any suitable type of wire that contracts when a current or a voltage is applied to the wire. For example, contracting wire 208 may be a muscle wire made from any suitable metal, such as nickel, titanium, or the like. Contracting wire 208 Supports 212 may route contracting wire 208 from one of wire components 210 to each of movable locking magnets 120 and to the other wire component. Information handling system 100 may include additional components without varying from the scope of this disclosure.

In an example, processor 202 may communicate with memory 204 and current source 206. Current source 206 may be coupled to both wire components 210. In certain examples, wire components 210 may be secured in any suitable manner. For example, wire components 210 may be soldered to a motherboard of information handling system 100. Wire components 210 may be secured to contracting wire 208 via any suitable manner, such as the wire components being crimped to opposite ends of the contracting wire.

During a basic input/output system (BIOS) power-on self-test (POST), processor 202 may receive a boot menu request. In an example, the boot menu request may be any suitable command to cause an exit from the BIOS POST. For example, the boot menu request may be a F12 menu request. In certain examples, an individual associated with information handling system 100 may select any suitable operation or action to be performed, such as an open chassis command. In response to the selection of the open chassis command, processor 202 may request a user authentication credential.

In an example, processor 202 may retrieve a stored authentication credential from memory 204 and compare the received credential with the stored credential. The authentication credential may be any suitable credential including, but not limited to, a password, a certificate, a fingerprint, a retinal scan, and facial recognition. If processor 202 determines that the credentials do not match, the processor may resume the BIOS POST and information handling system 100 may boot to the operating system (OS). If processor 202 determines that the credentials match, the processor may authenticate the open chassis command. In an example, if processor 202 receives the open chassis command as a BIOS ABI authorization command, the processor may automatically authenticate the command without comparing the credentials to stored credentials. In this example, the BIOS ABI command may be received from a trusted OS level application which processor 202 identifies as a source for secure commands.

After processor 202 authenticates the open chassis command, the processor may determine what applications and hardware may be operating and stop execution of the applications and hardware. Processor 202 may then initiate a shutdown of information handling system 100. In an example, when the applications and hardware of information handling system 100 are shutdown, processor 202 may cause current source 206 to provide an electrical charge to wire components 210.

In certain examples, current source 206 may provide the charge by providing a current to wire components 210, which in turn may apply a voltage to contracting wire 208. In an example, the resistance of contracting wire 208 may heat the contracting wire when a voltage is applied to the wire, and the increase in temperature may cause the contracting wire to contract or shrink in length. In a particular example, when 6-12 Volts are applied to contracting wire 208, the wire may contract in the range of 1% to more than 10% of the original length. In this example, this amount of contracting may offset or misalign locking magnetics 110 and 120 to disengage the two housings for a technician to access the internal components of information handling system 100.

After processor 202 causes the voltage to be applied to contracting wire 208, the processor may set a timer. In an example, the timer may be set to any suitable length of time, such as one to five minutes. In response to the timer expiring, processor 202 may send a discharge request to current source 206. Based on the discharge request, current source 206 may stop providing the current to wire components 210, which in turn may stop providing a voltage to contracting wire 208. When the voltage is removed from contracting wire 208, the wire may cool and may undergo a reversible shape change. For example, as contracting wire 208 cools, within a few seconds, the wire may return to original shape and an auto-lock state. Based on contracting wire 208 returning to the original shape, movable locking magnetics 120 may return to the locked position with the assistance of a spring as will be described with respect to FIGS. 3 and 4 below.

In an example, information handling system 100 is improved by preventing unauthorized hardware access, such as main board, memory, or the like, by locking magnetics 110 and 120 auto-locking the housings of the information handling system. While FIGS. 1 and 2 have been described with respect to locking magnetics 110 and 120, snap features or latches may be utilized with contracting wire 208 without varying from the scope of this disclosure. In this example, when contracting wire 208 contracts, the wire may pull on the snap feature or latch to disengage the housings of information handling system 100. For larger information handling systems such as desktops or servers, a wedge lock system can be implemented with contracting wire 208 to disengage housings.

Figure 3:
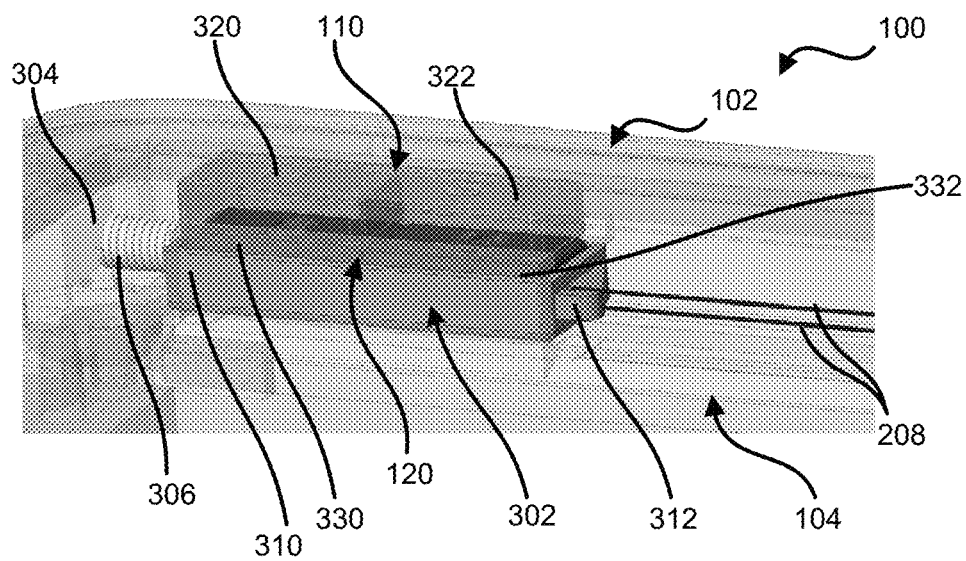
FIGS. 3 and 4 are perspective views of a magnetic lock for a chassis of an information handling system according to at least one embodiment of the present disclosure.
Figure 4:
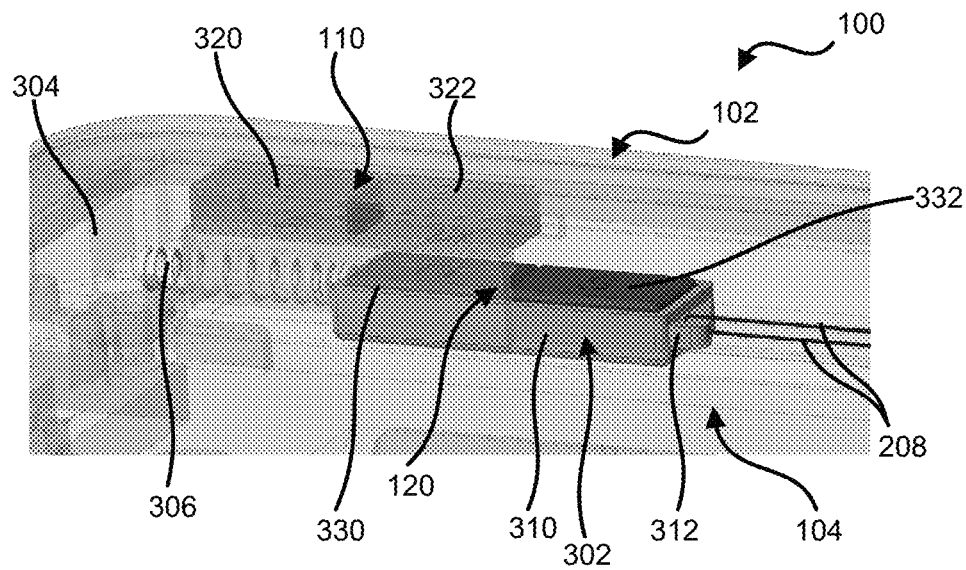

FIGS. 3 and 4 illustrate a portion of information handling system 100 according to at least one embodiment of the present disclosure. Information handling system 100 includes a magnetic carrier 302, a support 304, a spring 306, fixed locking magnetic 110, movable locking magnetic 120, and contracting wire 208. Magnetic carrier 302 includes a main body 310 and an attachment portion 312. Fixed locking magnetic 110 includes magnetics 320 and 322. Movable locking magnetic 120 includes magnetics 330 and 332. Information handling system 100 may include additional components without varying from the scope of this disclosure.

In an example, magnetics 320 and 322 may have different magnetic polarities directed to movable locking magnetic 120. For example, magnetic 320 may have a south magnetic polarity facing toward movable locking magnetic 120 and magnetic 322 may have a north magnetic polarity facing toward movable locking magnetic 120, or magnetic 320 may have a north magnetic polarity facing toward movable locking magnetic 120 and magnetic 322 may have a south magnetic polarity facing toward movable locking magnetic 120. In an example, magnetics 330 and 332 may have different magnetic polarities directed to fixed locking magnetic 110. For example, magnetic 330 may have a north magnetic polarity facing toward fixed locking magnetic 110 and magnetic 332 may have a south magnetic polarity facing toward fixed locking magnetic 110, or magnetic 330 may have a south magnetic polarity facing toward fixed locking magnetic 110 and magnetic 332 may have a north magnetic polarity facing toward fixed locking magnetic 110.

In certain examples, spring 306 may be in physical communication with support 304 and with main body 310 of magnetic carrier 302. In an example, spring 306 may be an extension spring such that the resting state is for the spring to be tightly coiled. In this example, spring 306 may enable movable locking magnet 120 to auto-lock by pulling or biasing main body 310 toward support 304. When movable locking magnet 120 is in the locked position, magnet 330 may be aligned with magnet 320, and magnet 332 may be aligned with magnet 322. In an example, magnets 320 and 330 may have different magnetic polarities, such as north and south or south and north, and magnets 322 and 332 may have different magnetic polarities, such as south and north or north and south. Based on magnets 320 and 330 having different polarities and magnets 322 and 332 having different polarities, locking magnets 110 and 120 may hold housing portions 102 and 104 together when movable locking magnet is in the locked position.

In an example, when the voltage is applied on contracting wire 208, the contracting wire may exert a force on attachment portion 312 to pull magnet carrier 302 and movable locking magnet 120 from the locked position to an unlocked position. The force exerted by contracting wire 208 may be greater than a combined force of spring 306 and the attraction of magnets 320 and 330. In this situation, contracting wire 208 may pull movable locking magnet 120, via magnet carrier 302, to the unlocked position as illustrated in FIG. 4.

Referring now to FIG. 4, When movable locking magnet 120 is in the unlocked position, spring 306 may be extended, and magnet 330 may be aligned with magnet 322. In an example, magnets 330 and 322 may have the same magnetic polarity. Based on the alignment of magnets 330 and 322, the force between the same magnetic poles may cause a self-left of housing 102 from housing 104. In an example, housing 102 may lift or separate from housing 104 only a small amount as long as an individual may be able to separate the housings the remaining.

In an example, a particular amount of time after movable locking magnet 120 is placed in the unlocked position, the voltage may be removed from contracting wire 208. After the voltage is removed from contracting wire 208, the wire may begin to cool and return to its original length. As contracting wire 208 returns to its original length, spring 306 may recoil and exert a force on main body 310 of magnet carrier 302. This force may pull movable locking magnet 120 to the locked position. When movable locking magnet 120 is in the locked position and an individual snaps housing 102 back onto housing 104, magnets 320 and 330 may be aligned and magnets 322 and 332 may be aligned as illustrated in FIG. 3. In this situation, the attractive force between magnets 320 and 330 and the attractive force between magnetics 322 and 332 may hold housings 102 and 104 together such that an individual may not open the chassis of information handling system 100. For clarity and brevity, FIGS. 3 and 4 have been described with respect to a single fixed locking magnet 110 and a single movable locking magnet 120, but all of the fixed locking magnets and all of the movable locking magnets in information handling system 100 may operate in substantially similar manner as described above.

Figure 5:
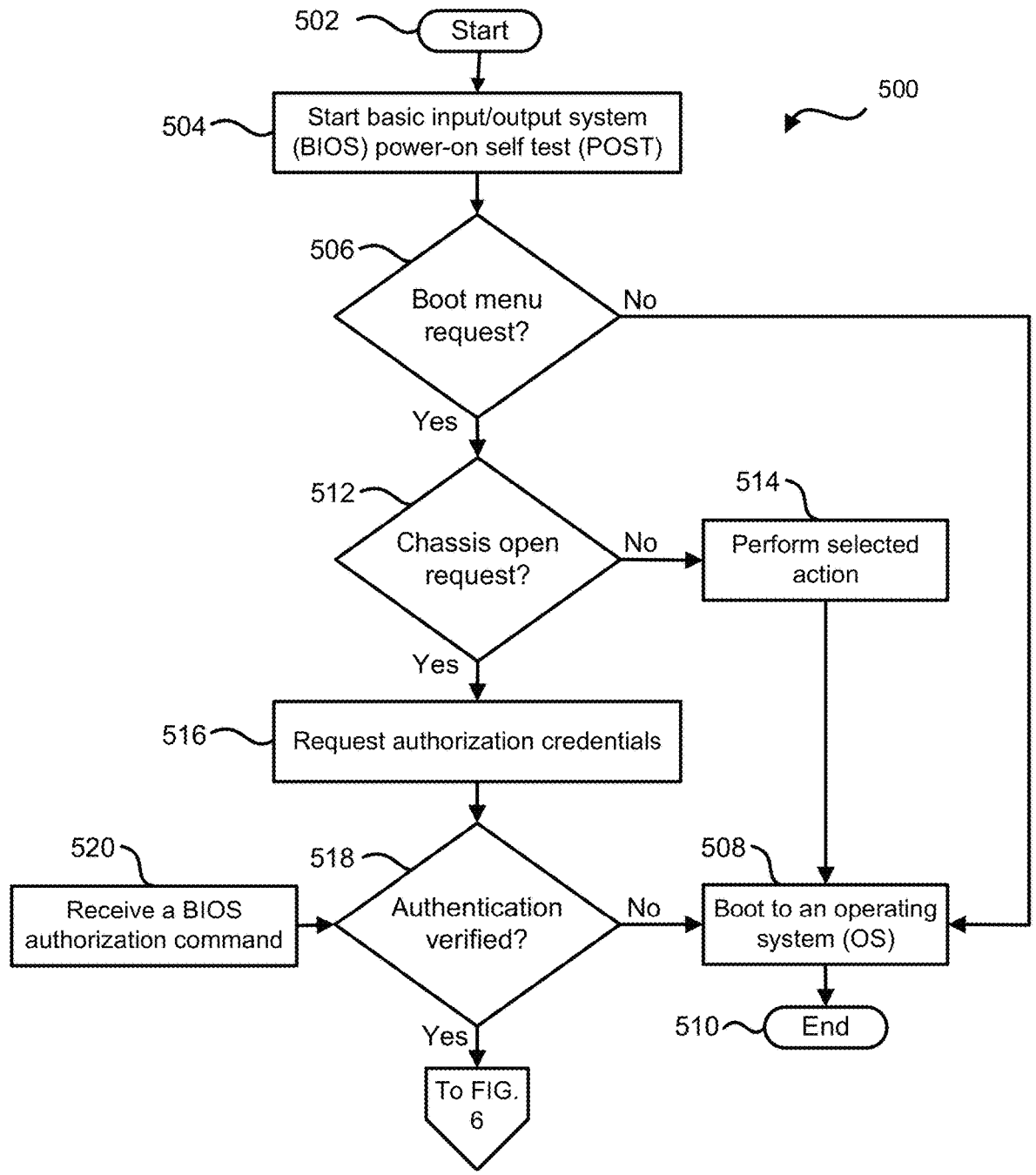
FIGS. 5 and 6 are a flow diagram of a method for controlling a chassis locking system of an information handling system according to at least one embodiment of the present disclosure.
Figure 6:
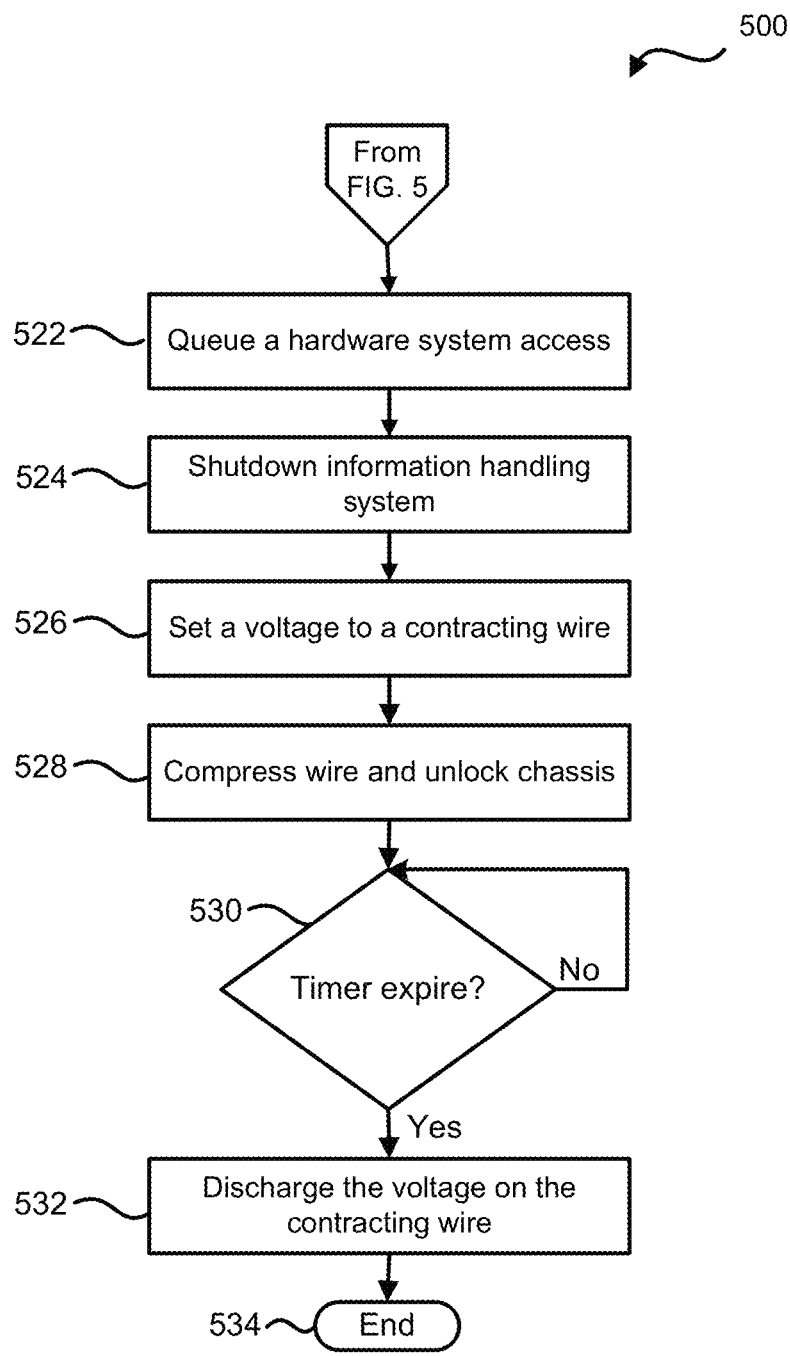

FIGS. 5 and 6 are a flow diagram of a method for controlling a chassis locking system of an information handling system according to at least one embodiment of the present disclosure, starting at block 502. In an example, method 300 may be performed by any suitable component including processor 202, current source 204, and magnetic locks 120 of FIG. 2. Not every method step set forth in this flow diagram is always necessary, and certain steps of the methods may be combined, performed simultaneously, in a different order, or perhaps omitted, without varying from the scope of the disclosure.

At block 504, a basic input/output system (BIOS) power-on self-test (POST) is started or initiated.

At block 506, a determination is made whether a boot menu request is received.

In response to a boot menu request not being received, the information handling system is booted to an operating system (OS) at block 508 and the flow ends at block 510.

In response to the boot menu request being received, a determination is made whether a chassis open request is received at block 512.

In response to the chassis open request not being received, a selected action is performed and the flow continues as described above with respect to block 508.

In response to the chassis open request being received, a request for authorization credentials is provided at block 516.

At block 518, a determination is made whether the received authentication credentials are verified. In an example, a processor of the information handling system may retrieve stored authentication credentials from a storage of the information handling system. The processor may then compare the received credentials with the retrieved credentials. If these credentials match, the received authentication credentials are verified at block 518. If the credentials do not match, the received authentication credentials are not verified at block 518.

At block 520, a determination is made whether BIOS authorization command has been received. In response to the BIOS authorization command being received the command, the authentication credentials are automatically verified at block 518. In response to the authentication credentials being verified, a voltage is set to be applied to a contracting wire of the information handling system during a subsequent shutdown and the flow continues at block 522 in FIG. 6.

At block 522, a hardware system access status is queued. At block 524, the information handling system is shutdown. At block 526, a charge or voltage is applied to a contracting wire. In an example, the processor may be an embedded controller such that the processor may operation while other components in an information handling system are shutdown. The processor may cause a current source to provide a current to wire components, which in turn may apply the voltage to the contracting wire.

At block 528, the contracting wire is compressed, and the chassis of an information handling system is unlocked. In an example, the compression of the contracting wire may exert a force on a movable locking magnet, and the force may cause the movable locking magnet to transition from a locked position to an unlocked position. When the movable locking magnet is in the unlocked position, the moveable locking magnet may repel a fixed locking magnet and a back housing of the chassis may pop up and away from a front housing.

At block 530, a determination is made whether a timer has expired. In an example, the processor of the information handling system may set the timer based on the voltage being applied to the contracting wire. In certain examples, the timer may be set to any suitable length of time including, but not limited to, 1-5 minutes. In response to the timer expiring, the voltage on the contracting wire is discharged at block 532 and the flow ends at block 534. When the voltage is removed or discharged from the contracting wire, the wire may cool, and the movable locking magnet may transition from the unlocked position to the locked position. Based on the movable locking magnet being in the locked position, the moveable locking magnet may attract the fixed locking magnet and the back housing of the chassis may be held in physical communication with the front housing.

Figure 7:
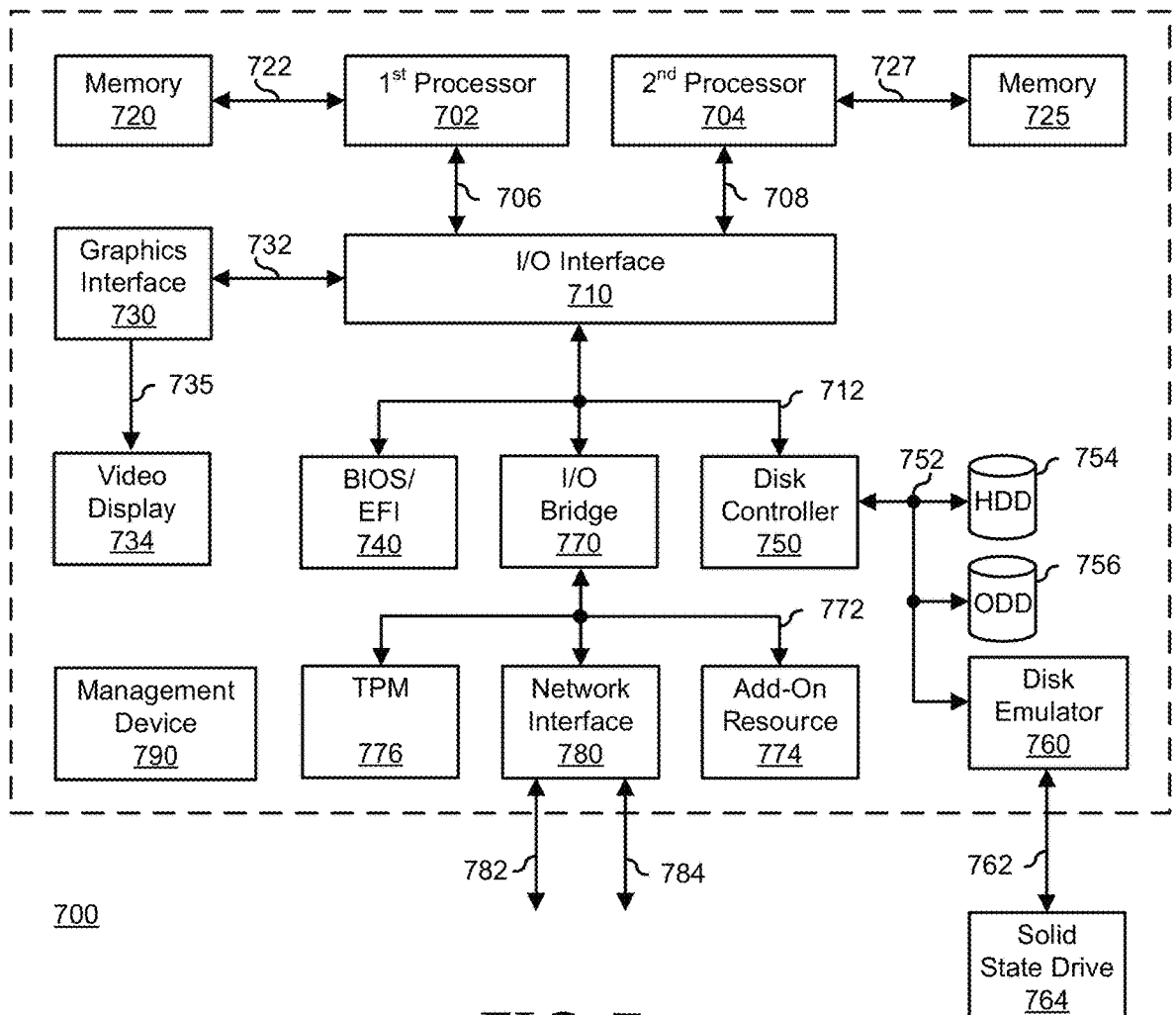
FIG. 7 is a block diagram of a general information handling system according to an embodiment of the present disclosure.

FIG. 7 shows a generalized embodiment of an information handling system 700 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 4394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising: top and bottom housings; a fixed locking magnet secured within the bottom housing; a movable locking magnet located within the top housing; and a contracting wire in physical communication with the movable locking magnet, the contracting wire to: shrink in length based on a voltage being applied to the contracting wire; and exert a first force on the movable locking magnet as the length of the contracting wire shrinks, wherein the movable locking magnet transitions from a locked position to an unlocked position based on the first force exerted by the contracting wire, wherein the top and bottom housings separate when the movable locking magnet is in the unlocked position; and a processor coupled to the contracting wire, the processor to: receive a chassis open request; receive an authentication credential associated with the chassis open request; in response to the authentication credential being verified: provide the voltage to the contracting wire while the information handling system is shutdown.

2. The information handling system of claim 1, further comprising:
a support secured within the top housing; and
a spring in physical communication with the support and with the movable locking magnet, the spring to bias the movable locking magnet toward the locked position.

3. The information handling system of claim 1, wherein the movable locking magnet and the fixed locking magnet are aligned when the movable locking magnet is in the locked position.

4. The information handling system of claim 1, wherein the movable locking magnet and the fixed locking magnet are misaligned when the movable locking magnet is in the unlocked position.

5. The information handling system of claim 4, wherein the top and bottom housings separate based on a repulsive force between the fixed locking magnet and the movable locking magnet created when the fixed and movable locking magnets are misaligned.

6. The information handling system of claim 1, wherein a second force exerted by the spring and a third force exerted by a magnetic attraction between the fixed and movable locking magnets combined to create a fourth force to hold the movable locking magnet in the locked position.

7. The information handling system of claim 6, wherein the first force exerted by the contracting wire is greater than the fourth force.

8. The information handling system of claim 1, the processor further to:
set a timer after the voltage has been provided to the contracting wire;
in response to an expiration of the time, the processor to discharge the voltage from the contracting wire, wherein the contracting wire returns to an original length when the voltage is discharged.

9. A method comprising:
receiving, by a processor of an information handling system, a chassis open request;
receiving an authentication credential associated with the chassis open request;
in response to the authentication credential being verified, providing a voltage to a contracting wire of an information handling system;
shrinking, by the contracting wire, in length based on the voltage being applied to the contracting wire;
exerting, by the contracting wire, a first force on a movable locking magnet as the length of the contracting wire shrinks; and
transitioning, by the movable locking magnet, from a locked position to an unlocked position based on the first force exerted by the contracting wire, wherein top and bottom housings of the information handling system separate when the movable locking magnet is in the unlocked position.

10. The method of claim 9, further comprising: biasing, by a spring, the movable locking magnet toward the locked position.

11. The method of claim 9, wherein the movable locking magnet and the fixed locking magnet are aligned when the movable locking magnet is in the locked position.

12. The method of claim 9, wherein the movable locking magnet and the fixed locking magnet are misaligned when the movable locking magnet is in the unlocked position.

13. The method of claim 12, further comprising: separating, by the top and bottom housings, based on a repulsive force between the fixed locking magnet and the movable locking magnet created when the fixed and movable locking magnets are misaligned.

14. The method of claim 9, wherein a second force exerted by the spring and a third force exerted by a magnetic attraction between the fixed and movable locking magnets combined to create a fourth force to hold the movable locking magnet in the locked position.

15. The method of claim 9, wherein the first force exerted by the contracting wire is greater than the fourth force.

16. The method of claim 9, wherein the voltage is provided to the contracting wire while the information handling system is shutdown.

17. The method of claim 9, further comprising:
setting, by the processor, a timer after the voltage has been provided to the contracting wire;
in response to an expiration of the time, discharging the voltage from the contracting wire, wherein the contracting wire returns to an original length when the voltage is discharged.

18. An information handling system comprising:
top and bottom housings;
a fixed locking magnet secured within the bottom housing;
a movable locking magnet located within the top housing;
a processor to receive a chassis open request, to receive an authentication credential associated with the chassis open request, and in response to the authentication credential being verified to provide an apply voltage signal during a next shutdown of the information handling system;
a current source to receive the apply voltage signal and provide a current during the next shutdown;
wire components to receive the current and provide a voltage based on the current; and
a contracting wire in physical communication with the movable locking magnet and with the wire components, the contracting wire to:
shrink in length based on the voltage being applied to the contracting wire; and
exert a first force on the movable locking magnet as the length of the contracting wire shrinks, wherein the movable locking magnet transitions from a locked position to an unlocked position based on the first force exerted by the contracting wire, wherein the top and bottom housings separate when the movable locking magnet is in the unlocked position.

19. The information handling system of claim 18, wherein the movable locking magnet and the fixed locking magnet are aligned when the movable locking magnet is in the locked position, and the movable locking magnet and the fixed locking magnet are misaligned when the movable locking magnet is in the unlocked position.

* * * * *